United States Patent
Andrews, Jr. et al.

[15] 3,671,427
[45] *June 20, 1972

[54] LIGNITE PRODUCTS AND COMPOSITIONS THEREOF

[72] Inventors: Robert S. Andrews, Jr., Houston, Tex.; William C. McDaniels, Hobbs, N. Mex.

[73] Assignee: N L Industries, Inc., New York, N.Y.

[ * ] Notice: The portion of the term of this patent subsequent to Feb. 10, 1987, has been disclaimed.

[22] Filed: Jan. 15, 1970

[21] Appl. No.: 3,216

Related U.S. Application Data

[63] Continuation-in-part of Ser. No. 539,312, April 1, 1966, Pat. No. 3,494,865.

[52] U.S. Cl. ......................252/8.5 M, 252/8.55 R, 252/308, 260/404.5
[51] Int. Cl. .......................................................C10m 1/36
[58] Field of Search.........................252/8.5 M, 8.55 R, 308; 260/404.5

[56] References Cited

UNITED STATES PATENTS

| | | |
|---|---|---|
| 3,494,865 | 2/1970 | Andrews et al..........................252/8.5 |
| 3,346,489 | 10/1967 | Dickson et al..........................252/8.5 |
| 3,379,650 | 4/1968 | Beasley et al..........................252/308 |

*Primary Examiner*—Herbert B. Guynn
*Attorney*—Delmar H. Larsen, Charles F. Kaegebehn and Robert L. Lehman

[57] ABSTRACT

Reaction products of humic acid with long-chain fatty acyl partial amides of a polyalkylene polyamine, such as the reaction product obtained using tall oil fatty acids and tetraethylene pentamine, the salt linkage being optionally, partially or largely converted to amide linkage by heat treatment. The humic acid optionally may be in part reacted with a long-chain alkyl ammonium cation. The novel products are useful in compounding oil base well-working fluids; as corrosion inhibitors; and for other uses.

8 Claims, No Drawings

LIGNITE PRODUCTS AND COMPOSITIONS THEREOF

This application is a continuation-in-part of our co-pending application, Ser. No. 539,312, filed Apr. 1, 1966, now U.S. Pat. No. 3,494,865.

This invention relates to derivatives of humic acid, as obtained, for example, from lignite, and useful compositions thereof, particularly including oil-base fluids for use in well-working operations such as drilling, fracturing, packing, and the like, including well-working processes with such compositions.

The present invention represents an enlargement and an improvement over certain of the inventive subject matter set forth in U.S. Pat. No. 3,168,475 which issued Feb. 2, 1965, to a common assignee, and the patent is hereby incorporated herein by reference.

In the rotary drilling of wells for oil and gas, drilling fluids are used which are circulated in such a manner as to remove cuttings and to support the walls of the hole. Most commonly such fluids are water base, comprising, for example, clay dispersed in water, but in recent years extensive use has been made of fluids having oil as the base, i.e., the continuous liquid vehicle.

The oily vehicle is converted into a well-working fluid suitable for the purpose at hand, such as a drilling fluid, by adding various materials thereto for a number of purposes. Thus, thickening agents may be added, so that the fluid will support cuttings and finely divided solid additives. Again, weighting materials such as ground barite or calcite may be added to increase the density of the fluid. Also, and of great importance, substances may be added which serve to reduce the filtration of the fluid, as takes place when the fluid is in contact with permeable formations. These oil-base fluids may also contain water in the form of water-in-oil emulsion, so that the continuous phase of the fluid is still oil.

In the earlier development of oil-base fluids of the types described, primary attention was given to providing thickening additives. Many were found and have been used at various times, including carbon black; soaps of fatty acids, rosin, tall oil, and the like organic acids; asphalts of various kinds; and so forth. In recent years, however, it has become apparent that a low fluid loss is the most important characteristic of these fluids to be sought for, and that thickening to whatever degree desired can generally be readily accomplished by any of several means, provided that the fluid loss is maintained at a very small value, by reducing the ability of the fluid to undergo filtration.

The technique set forth in the aforesaid U.S. Pat. No. 3,168,475 provides an extremely useful material for reducing filter loss in fluids of the type described. It has been found, however, that in some cases, while the thermal stability of the compounds is good, nevertheless, there is room for improvement, since use of such well-working fluids for prolonged periods at very high temperatures sometimes leads to a partial loss of the desirable properties, particularly from the standpoint of filter loss.

An object of the present invention, accordingly, is to provide a novel derivative of humic acid having broad utility.

Another object of the invention is to provide well-working fluid compositions containing the said derivative, which exhibit improved filter-loss-reducing properties as compared to those of U.S. Pat. No. 3,168,475 under extreme conditions of temperature.

Other objects of the invention will appear as the description thereof proceeds.

Generally speaking and in accordance with illustrative embodiments of our invention, we react humic acid with from about 50 to about 110 percent of its base-combining capacity, with a fatty acid partial amide of a polyalkylene polyamine so as to produce an adduct; and furthermore, we may treat an oily liquid, which is most desirably diesel oil but which may also be any available crude oil, topped or untopped or various fractions of crude oil, including kerosene, fuel oil, and the like, with the aforementioned humic acid derivative; and, optionally, we may add thereto any of the commonly employed additives for oil-base well-working fluids of this type, which as is well known comprises ground minerals, such as barite, celestite, calcium carbonate, spent refinery clays, and the like; soaps, blown asphalts, carbon black, organophilic clays, and the like; water, and other known materials.

Humic acid is a material of wide distribution and is present in soils, peat, and coals, particularly lignite or brown coal. It is an acid in which carboxyl and phenolic hydroxyl groups contribute base-combining ability. It is soluble in alkalies, such as caustic soda and sodium carbonate, has a deep brown color, and is readily soluble in water when converted to its alkali metal salt, which may be then termed an alkali metal humate, the commonest example of which is sodium humate.

While humic acid is present in soils and peat, and may be extracted from them, for example, with dilute aqueous alkali, we prefer to obtain humic acid for the purposes of this invention in the form of lignite of high alkali solubility, of which vast deposits are found throughout the world, including, particularly, the United States, for example, in North Dakota, Texas, New Mexico and California. While we do not mean to limit ourselves thereby, we prefer a lignite having a solubility in dilute aqueous sodium hydroxide of at least 75 percent by dry weight, as this provides a reasonable compromise between cost and efficacy in the final product.

The fatty acid partial amide is an amide of a fatty acid, having from 12 to 22 carbon atoms, and which may be saturated or unsaturated, and of a polyalkylene polyamine having from three to seven amino groups, and thus including tri-amines such as di-ethylene tri-amine, tetramines such as tri-ethylene tetramine, pentamines such as tetraethylene pentamine, and higher analogs of these, up to and including seven amino groups. The amide is only partial, that is, it is such that from one to all but one of the nitrogen atoms are present in the form of a fatty acid amide, the balance being in the form of free amino groups, except that, of course, the latter are in the pentavalent state in combination with the humic acid to form a humate. Where the contemplated end use is in a well-working fluid, we prefer reacting from about one-third to about two-thirds of the nitrogen atoms in the manner described. It may be noted that polyalkylene polyamines in which the alkylene repeating group is propylene, such as dipropylene triamine, may be used, but in general we prefer the ethylene series. We prefer fatty acids within the broad group already specified, having from 14 to 18 carbon atoms and saturated and mono and di-unsaturated, which of course includes the very common myristic, palmitic, stearic, oleic, and linoleic acids. These are conveniently obtainable commercially as tallow fatty acids; corn, cottonseed, soya fatty acids; and tall oil fatty acids, all of which may be natural or hydrogenated. Of these, we prefer tall oil fatty acids. As the polyamine, we prefer tetraethylene pentamine. The adduct as described and wherein the partial amide is present to the extent of about 110 percent of the base-combining capacity of the humic acid probably represents salt formation for 110 percent, the remaining 10 percent being adsorption, although in view of the complicated nature of the constituents, exact structural analysis is difficult and somewhat uncertain. Also, depending upon the drying temperature, where heat is used for such a step, the adduct may undergo a certain extent of amidification where the amino groups of the polyamines are combined with the carboxyl groups of the humic acid. For all of these reasons, we find it best to describe the aforesaid inventive product as an adduct. It may also be particularly described as an onium-amino adduct of humic acid and a fatty acyl partial amide of a polyalkylene polyamine, wherein the fatty acyl has from 12 to 22 carbon atoms, and more especially, wherein the polyalkylene polyamine has from three to seven nitrogen atoms, inclusive; and wherein "onium" refers to fact that those nitrogens of the polyamine which combine with the humic acid are in the pentavalent form.

It may be remarked that the term "adduct" is thus used in its modern sense of a reaction product wherein the binding forces causing the two moieties to form a product may be of a diverse nature, including even the type of absorptive bonding between certain polymers and clays, for example. The term "adduct" is used in this sense in British Pat. No. 1,146,668 of Imperial Chemical Industries Ltd., to characterize the reaction product of poly(vinylpyrrolidone) and a hydrophilic clay such as montmorillonite. Again, "adduct" is used in the article by C. H. Smith in the American Chemical Society serial *Organic Coatings and Plastics Chemistry* 28, 217–225 (1968) entitled "Boron Trifluoride-Amine Adducts as Hardeners for Liquid Epoxy Resins" to characterize the coordination compounds formed by reacting boron trifluoride with such substances as aniline, butyl amine, piperidine, and the like.

Generally speaking, the adducts for use in our invention may be produced by bringing together humic acid and the partial amide compound in its base form. The base and the acid neutralize each other with salt formation, which then may be amidated by heat treatment if desired, so as to produce the desired adduct in accordance with this aspect of the invention. Another general method of preparation is to convert the humic acid to a simple salt by reaction with an alkali, so as to produce sodium humate, potassium humate, ammonium humate, and the like, by reaction with sodium hydroxide, potassium hydroxide, or ammonium hydroxide, respectively. The partial amide compound is caused to be present in the form of a simple salt. Thus, the free amine groups of the partial amide may be reacted with a simple acid such as hydrochloric, acetic, and the like to give the corresponding partially amidated polyalkylene polyamine chloride or acetate, respectively. This method of procedure has the advantage that such onium salts, and the simple humates as described, are both water soluble, so that solutions of each reactant may be made, and the reaction completed by mixing solutions thereof together. Water, or mixtures of water with methanol, ethanol, isopropanol, acetone, and the like may also be used. Again, the product thus formed may be recovered and subjected to heat treatment to amidate it, if desired, as already described.

For the purposes of the invention, the preparation of the adducts as just described may be carried out without necessarily having all of the reactants in solution. That is, the humic acid and partial amide compound can be heated together in a neutral liquid carrier such as mineral oil; or they can be mixed together in a pug mill or like apparatus, conveniently with enough moisture to facilitate the mechanical handling of the mixture and to speed up the reaction. This method can also be employed where the partial amide compound is in a salt form, as, for example, the hydrochloride; and indeed, the alkali necessary to convert the humic acid to its simple salt form such as sodium humate may be included in the mixture fed to the pug mill. Thus, a mixture in suitable proportions of weathered lignite, an alkali such as sodium hydroxide or borax or a mixture thereof, and the selected partial amide salt, with or without added water (or aqueous lower alcohol or ketone) may be passed through a pug mill to produce the inventive product. Where a long-chain alkyl ammonium cation is also incorporated as explained hereinbelow, this may be added along with the mixtures of reactants fed to the pug mill at the same time.

Subsequent to the production of the adduct, it may be used as such, or it may be dried, with or without subsequent grinding. Where drying is carried out, it may be at relatively low temperatures, such as 60°–120° C.; or it may be at a higher temperature, such as, for example about 300° C. In general, we prefer drying at from 200° to 400° C., and grinding the dried product, for example, to pass a 100-mesh screen. Such a product is easily stored, readily handled, and easy to incorporate in various compositions in which our inventive product is used.

It will be clear from the above that the inventive adduct may be essentially a salt of humic acid, or a full amide, or an adduct containing both salt and amide linkages, depending primarily upon the extent to which salt linkages have been amidified by heat treatment. As a general rule, heating at not more than about 200° C. produces little or no amidation, while heating at more than about 260° C. will generally convert at least 90 percent of the salt linkages to amide linkages. Heating at intermediate temperatures may be expected to yield adducts of intermediate character, such as 50:50 salt:amide. Some examples will be given later.

Where the full base-combining capacity of the humic acid has not been utilized, that is, when the partial amide has been combined with the humic acid in an equivalent proportion of less than 100 percent of the base-combining ability of the humic acid, we may, optionally although not necessarily, utilize the remaining base-combining capacity for reaction with an alkyl ammonium cation in which at least one alkyl radical is present which has from 12 to 22 carbon atoms in a straight chain, as described in U.S. Pat. No. 3,168,478. Typical of such alkyl ammonium cations are dimethyldioctadecylammonium; dimethylcetyloctadecylammonium; didecylammonium; octadecylammonium; and the like.

Our inventive adducts, whether or not containing the alkyl ammonium cations just referred to, may be used as produced, and preferably after drying and grinding for inclusion in well-working fluids of the type already described. A certain amount of agitation, particularly at elevated temperatures, is generally necessary to effect good dispersion of our inventive adducts in such fluids. Generally, means will be present at the well site for obtaining such agitation and heat; and even when these are lacking, subsequent use of the well-working fluids, particularly where circulation at high bottom-hole temperatures is involved, will bring about the desired dispersion. Generally, where the base fluid has some aromatic content, as is the case with crude oils in certain oil fields, dispersion will be rapid indeed.

In many cases it will be desirable to expedite the dispersion of our inventive adducts in the well-working fluids, without depending upon down-in-the-hole circulation. This is particularly desirable where the base oil of the well-working fluid is essentially paraffinic in nature. In that case, any of several dispersant additives may be included with our adduct, such as any of the dispersing additives described in U.S. Pat. No. 3,379,650, issued Apr. 23, 1968. The contents of that application are incorporated herein by reference. Thereby disclosed herein (and in that application) are, particularly, nonyl phenol, octyl phenol, phenol, alkyl phenols generally from methyl through dodecyl and thus having from one to 12 carbon atoms in the alkyl group, pentachlorophenol, salicylic acid, benzoic acid, phthalic acid, and the like. Of these, we prefer nonyl phenol, as it is effective, easily handled, and widely obtainable commercially.

Where such a dispersing additive is used, it may be present in any amount which is lesser than the amount of the inventive adduct. A range which has been found practical, balancing cost against benefits received, is from about 8 to 10 percent by weight of the adduct.

We now give some examples showing the practice of our invention:

EXAMPLE 1

950.4 grams of commercial tall oil fatty acid was mixed with 249.6 grams of commercial tetraethylene pentamine (thus, 3.25 and 6.50 gram equivalents respectively, so that about half of the amino groups of the tetraethylene pentamine were neutralized) and the mixture heated to 400° F. for 1 hour. It was cooled, and the phosphate salt prepared by mixing with 3.25 gram equivalent of phosphoric acid. 200 grams of powdered weathered North Dakota lignite (having an alkali solubility of about 80%) and 200 grams of the fatty acid partial amide phosphate salt were added to 400 grams of diesel oil, and the mixture heated to 230° C. for about 30 minutes. This brought about the production of an adduct in accordance with the invention, the adduct being dispersed in the form of a relatively thick paste in the diesel oil.

EXAMPLE 2

To 350 ml. of diesel oil, 30 grams of the product of Example 1 was added, and the mixture stirred. Thus, the final composition was about 380 ml. diesel oil and 15 grams of the adduct proper. This was tested as a well-working fluid for filtration loss in accordance with the American Petroleum Institute testing procedure, and gave a fluid loss of 2.5 ml. in 30 minutes.

EXAMPLE 3

A well-working fluid of the weighted type was prepared by mixing together 192 ml. diesel oil, 30 grams of the product of Example 1 (and thus containing 15 grams of the inventive adduct), 6 grams of dimethyldioctadecylammonium attapulgite, and 470 grams of 325-mesh barite, giving a total volume of 350 ml. This was tested as described in Example 2, and gave a fluid loss of 0.5 ml.

EXAMPLE 4

A production-size pug mill was fed continuously with the following materials at the rates specified:

| | |
|---|---|
| Lignite, 80% alkali solubility | 4.2 lbs./min. |
| Tall oil fatty acid half amide of tetraethylene pentamine, as described in the first sentence of Example 1 | 4.0 lbs./min. |
| Water | 1.2 lbs./min. |
| Nonyl phenol | 0.3 lbs./min. |

The lignite and the half amide, preheated to 150° F., were fed to an eight-foot cut-flight conveyor preceding the pug mill, and thus thoroughly mixed. The water was introduced as the mixed material entered the pug mill. The nonyl phenol was injected into the pug mill about 2 feet from the exit head, the pug mill being 6 feet long. A hot, fully reacted adduct emerged from the pug mill, and was tray-dried at 150°–200° F. for several hours, and then ground so that 90 percent passed through a 100-mesh screen.

When one gram of the product was dispersed in 350 ml. diesel oil so as to produce a well-working fluid, an A.P.I. fluid loss of less than 2.0 ml. was obtained.

EXAMPLE 5

An adduct in accordance with the invention was prepared, in which a minor proportion of the acid sites of the lignite was occupied by a long-chain ammonium cation, as set forth hereinabove.

The following materials were put in a reaction vessel fitted with an agitator and with heating means, and mixed at 180° F. for 30 minutes:

| | |
|---|---|
| Water | 1620 gallons |
| Lignite, as in Example 1 | 2250 pounds |
| Borax | 810 pounds |

The following long-chain onium salt was then added, and agitation continued for about one hour:

| | |
|---|---|
| Dimethyl-di-hydrogenated tall oil fatty ammonium chloride | 563 pounds |

A mixture of the following components was prepared, added to the rest in the vessel, and allowed to react for 15 minutes:

| | |
|---|---|
| Tall oil fatty acid half amide as in Example 4: | 1687 pounds |
| Isopropyl alcohol | 450 pounds |
| Hydrochloric acid, 20 Baume | 400 pounds |

The following materials were then added and allowed to mix for 10 minutes; the kaolin was a grinding aid:

| | |
|---|---|
| Kaolin | 300 pounds |
| Nonyl phenol | 450 pounds |

The solids, which consisted of the inventive adduct intermixed with the kaolin, were filtered off, dried in a rotary dryer, and ground.

EXAMPLE 6

The product of Example 5 was tested in a well-drilling fluid, and compared with a similar well-drilling fluid containing instead a control made in the same way as the adduct of Example 5 except that all of the base-combining capacity of the lignite was reacted with dimethyl-di-hydrogenated tall oil fatty ammonium chloride. No half-amide was used in this control. It thus corresponded to the inventive product of U.S. Pat. No. 3,168,475.

The test muds were compounded of 228 ml. diesel oil; 15 grams of a commercial mud invert-emulsifier which was essentially a calcium tall oil soap; 2 grams of dimethyldioctadecylammonium attapulgite; 122 ml. water; 500 grams barite; and 10 grams of either the product of Example 5 or the control as already described, to give a total volume per sample of 350 ml.

The mud samples were treated and tested as shown in the following tabulation:

| | Ex. 5 | Control |
|---|---|---|
| Values obtained after stirring for 20 minutes and hot-rolling for 16 hours at 150° F.: | | |
| Plastic viscosity, cp: | 48 | 48 |
| Yield point, lb./100 sq. ft. | 4 | 6 |
| Filtrate, A.P.I., ml: | 0 | 0 |
| Filtrate at 300° F. and 500 p.s.i., ml: | 2.0 | 3.0 |
| Values obtained after static aging at 300° F. for sixteen hours: | | |
| Filtrate, A.P.I., ml: | 0 | 0 |
| Filtrate at 300°F. and 500 p.s.i., ml: | 2.8 (1) | 7.2 (2) |

Notes: (1) Regular 30-minute test.
(2) Lost 7.2 ml. in one minute.

EXAMPLE 7

Adduct Preparation

To 500 grams of diesel oil was added 292 gm. of acid washed lignite (ca. 1 percent hydrochloric acid followed by repeated distilled water washings) containing 42 gm. of water as moisture and 250 gm. of the partial amide indicated in the table below. This mixture was heated to the indicated maximum temperature and the amount of water and diesel oil removed was measured. The amount of water removed was used to calculate the degree of amidification of the free amine groups of the partial amide by the hydrogen lignite. The sample obtained contained diesel oil and an adduct (amide and/or salt) of the partial amide and the hydrogen lignite.

Sample Evaluation

Samples A, B, C. D: To 239 ml. of diesel oil were added 25 gm. of the sample containing the amount of adduct indicated in the last line of the table, 4 gm. of dimethyldioctadecylammonium attapulgite, and 470 gm. of minus 325 mesh barite. The mixture was stirred to give a weighted well-working fluid. This fluid was static aged at 350° F. for 16 hours. It was then tested upon cooling to room temperature for filtration loss in accordance with the American Petroleum Institute testing procedure. The filter losses obtained are given in the table.

Sample E: To 350 ml. of diesel oil was added 20 gm. of this sample. After mixing the filtration loss was determined in accordance with the API testing procedure. The filter loss obtained is given in the table.

| | SAMPLE NO. | | | | |
|---|---|---|---|---|---|
| | A | B | C | D | E |
| Preparation: | | | | | |
| Partial Amide* | 0.5 | 0.5 | 0.5 | 0.8 | 0.8 |

| | | | | | |
|---|---|---|---|---|---|
| Max. reaction temp.°C: | 252 | 230 | 200 | 250 | 175 |
| Diesel oil removed, gm: | 44 | 39 | 15 | 150 | 19 |
| Total water removed, gm: | 54 | 48 | 33 | 45 | 29 |
| Water lost from reaction, gm: | 12 | 6 | 0 | 3 | 0 |
| % Amino groups amidated with Lignite: | 92 | 46 | 0 | 85 | 0 |
| Evaluation: | | | | | |
| A.P.I. filter loss, ml: | 2.4 | 0.6 | 0 | 1.0 | 1.0 |
| Gm adduct in test fluid: | 12.9 | 13.1 | 12.7 | 14.7 | 12.7 |

*Partial Amide 0.5—Obtained by the reaction of tetraethylenepentamine and tall oil fatty acid in a molar ratio of 1:2.5 at 400°F for one hour. The molecular weight of this partial amide is: $(1m)(189gm/m)_{TEPA}+(2.5m)(290gm/m)_{TOFA}-(2.5m)(18gm/m)_{H_2O} = 870$ gm/m. Since this partial amide contains 2.5 free amino groups per molecule, one mole can react with an additional 2.5 moles of acid for eventual 100% conversion to an amide. Since 18 gm of water is removed per mole of acid reacted, then 45 gm of water will be obtained on reacting 870 gm of this partial amide with an acid (13 gm of water per 250 gm of partial amide) for 100% amidation.

*Partial Amide 0.8—Obtained by the reaction of tetraethylenepentamine and tall oil fatty acid in a molar ratio of 1:4 at 400°F for one hour. The molecular weight of this partial amide is: $(1m)(189gm/m)_{TEPA}+(4m)(290gm/m)_{TOFA}-(4m)(18gm/m)_{H_2O}=1277$ gm/m. Since this partial amide contains 1 free amino group per molecule, one mole can react with an additional 1 mole of acid forming 1 mole of water (18gm) for 100% conversion to an amide (3.5 gm of water per 250 gm of partial amide).

It will be observed that all of the adducts prepared in accordance with the invention were effective in the well-working compositions tested. Moreover, the salt:amide ratio in the adducts ranged from 100:0 to 8:92. The test series also illustrates the effect of temperature on the salt:amide ratio of the adduct. This ratio can readily be carried to 0:100 by heating to a higher temperature than any used in this series of tests.

Besides their effectiveness in well-working fluids, the inventive adducts have utility in diverse fields such as emulsification, emulsion breaking, and corrosion inhibition.

When used as an emulsion breaker, particularly for crude oil emulsions, we find it best to amidify most of the nitrogen atoms with the fatty acyl. Thus, where tetraethylene pentamine is used, we prefer to react three or four fatty acyls per molecule. Their employment in breaking such emulsions follows the general practice, as described for example in Chapter 12 of the book by William Clayton entitled "The Theory of Emulsions and their Technical Treatment", Ed. 4, Philadelphia, 1943.

Our inventive adducts are particularly well-adapted as emulsifying agents for those of the water-in-oil type, where the oil phase may be for example a mineral oil. Here again, the manner of use is as described for such emulsifying agents generally in the book of Clayton referenced above. For this use, we find best a fatty acyl content of as little as one per molecule of polyalkylene polyamine.

The inventive adducts are effective as corrosion inhibitors, especially in connection with petroleum production for the protection of down-the-hole and surface steel casing, piping and tubing. Here again, a relatively low fatty acyl: polyamine ratio is best, such as one fatty acyl per polyamine molecule, or two for the polyamines having relatively large numbers of nitrogen atoms. The manner of use follows the general practice, as outlined for example in the book by J. I. Bregman entitled "Corrosion Inhibitors", New York and London, 1963, especially Chapter 5 therein.

While we have illustrated our invention by the use of specific ingredients, reaction conditions, and the like, it will be understood that numerous variations, equivalents, and alternatives may be employed in its practice, all within the scope of the claims which follow.

Having described our invention we claim:

1. A composition of matter consisting essentially of an adduct of humic acid and a fatty acyl partial amide of a polyalkylene polyamine having from between three and seven nitrogen atoms and wherein said partial amide has fatty acyl to the extent of between one and all but one of said nitrogen atoms and wherein said fatty acyl has from 12 to 22 carbon atoms and wherein said partial amide is linked to said humic acid by an amide linkage together with an effective dispersing amount but less than that of said adduct of a dispersing additive selected from the class consisting of phenol, alkyl phenols in which said alkyl group has from one to 12 carbon atoms, pentachlorophenol, salicylic acid, benzoic acid, and phthalic acid.

2. A composition of matter in accordance with claim 1 in which said partial amide is linked to said humic acid by both salt linkages and amide linkages.

3. An oil base well-working fluid consisting essentially of a major proportion of oil and a minor proportion but sufficient to substantially lower the filter loss of an adduct of humic acid and a fatty acyl partial amide of a polyalkylene polyamine having from between three and seven nitrogen atoms and wherein said partial amide has fatty acyl to the extent of between one and all but one of said nitrogen atoms and wherein said fatty acyl has from 12 to 22 carbon atoms and wherein said partial amide is linked to said humic acid by an amide linkage.

4. A fluid in accordance with claim 3 in which a dispersing additive is present in an amount effective to expedite dispersion of said adduct but an amount less than that of said adduct.

5. An oil base well-working fluid in accordance with claim 3 in which partial amide is linked to said humic acid by both salt linkages and amide linkages.

6. A fluid in accordance with claim 5 in which a dispersing additive is present in an amount effective to expedite dispersion of said adduct but an amount less than that of said adduct.

7. In a process for drilling a well wherein there is circulated in the well an oil-base drilling fluid subject to filtration into permeable formations penetrated by the well, the method of maintaining said filtration at a selected low value during said drilling which comprises admixing with said drilling fluid an adduct of humic acid and a fatty acyl partial amide of a polyalkylene polyamine having from between three and seven nitrogen atoms and wherein said partial amide has fatty acyl to the extent of between one and all but one of said nitrogen atoms and wherein said fatty acyl has from 12 to 22 carbon atoms and wherein said partial amide is linked to said humic acid by an amide linkage.

8. A process in accordance with claim 7 in which said partial amide is linked to said humic acid by both salt linkages and amide linkages.

* * * * *